United States Patent
Isaksson et al.

(10) Patent No.: US 9,891,321 B2
(45) Date of Patent: Feb. 13, 2018

(54) METHOD AND ARRANGEMENT FOR DEVELOPING A THREE DIMENSIONAL MODEL OF AN ENVIRONMENT

(71) Applicant: Vricon Systems Aktiebolag, Linköping (SE)

(72) Inventors: Folke Isaksson, Linköping (SE); Ingmar Andersson, Linköping (SE); Johan Bejeryd, Linköping (SE); Johan Borg, Linköping (SE); Per Carlbom, Linköping (SE); Leif Haglund, Brokind (SE)

(73) Assignee: VRICON SYSTEMS AKTIEBOLAG, Linköping (SE)

( * ) Notice: Subject to any disclaimer, the term of this patent is extended or adjusted under 35 U.S.C. 154(b) by 183 days.

(21) Appl. No.: 14/762,174

(22) PCT Filed: Jan. 21, 2013

(86) PCT No.: PCT/SE2013/050044
§ 371 (c)(1),
(2) Date: Jul. 20, 2015

(87) PCT Pub. No.: WO2014/112911
PCT Pub. Date: Jul. 24, 2014

(65) Prior Publication Data
US 2015/0362595 A1    Dec. 17, 2015

(51) Int. Cl.
*G06T 15/00* (2011.01)
*G01S 17/89* (2006.01)
(Continued)

(52) U.S. Cl.
CPC .............. *G01S 17/89* (2013.01); *G01C 11/06* (2013.01); *G01C 21/00* (2013.01); *G01S 17/023* (2013.01);
(Continued)

(58) Field of Classification Search
None
See application file for complete search history.

(56) References Cited

U.S. PATENT DOCUMENTS

| 6,757,445 B1 | 6/2004 | Knopp | |
|---|---|---|---|
| 2005/0031197 A1* | 2/2005 | Knopp | G01C 11/06 382/154 |

(Continued)

FOREIGN PATENT DOCUMENTS

| EP | 1 418 402 A1 | 5/2004 |
|---|---|---|
| WO | WO-2009/003529 A1 | 1/2009 |

OTHER PUBLICATIONS

International Search Report and Written Opinion in PCT International Application No. PCT/SE2013/050044, dated Nov. 12, 2013.
(Continued)

*Primary Examiner* — Zhengxi Liu
*Assistant Examiner* — Khoa Vu
(74) *Attorney, Agent, or Firm* — Venable LLP; Jeffri A. Kaminski (57) ABSTRACT

The present invention relates to a method and arrangement for developing a 3D model of an environment. The method comprises steps of providing a plurality of overlapping images of the environment, each image associated of navigation data, providing distance information, said LIDAR information comprising a distance value and navigation data from a plurality of distance measurements, and developing the 3D model based on the plurality of overlapping images and the distance information. The step of developing the 3D model comprises the steps of providing the 3D model based on the plurality of overlapping images; and updating the 3D model with the distance information using an iterative process.

19 Claims, 6 Drawing Sheets

(51) Int. Cl.

| | | |
|---|---|---|
| *G01C 11/06* | (2006.01) | |
| *G06T 17/05* | (2011.01) | |
| *G01S 17/02* | (2006.01) | |
| *G01C 21/00* | (2006.01) | |
| *G06K 9/62* | (2006.01) | |
| *G06T 19/20* | (2011.01) | |
| *H04N 13/02* | (2006.01) | |
| *G01S 17/42* | (2006.01) | |

(52) U.S. Cl.
CPC ............ *G01S 17/42* (2013.01); *G06K 9/6215* (2013.01); *G06T 17/05* (2013.01); *G06T 19/20* (2013.01); *H04N 13/0207* (2013.01); *G06T 2200/04* (2013.01)

(56) References Cited

U.S. PATENT DOCUMENTS

| | | | |
|---|---|---|---|
| 2006/0006309 A1 | 1/2006 | Dimsdale et al. | |
| 2007/0031064 A1 | 2/2007 | Zhao et al. | |
| 2009/0322742 A1 | 12/2009 | Muktinutalapati et al. | |
| 2010/0026809 A1* | 2/2010 | Curry | H04N 5/222 |
| | | | 348/157 |
| 2010/0118053 A1* | 5/2010 | Karp | G01C 11/06 |
| | | | 345/630 |
| 2010/0204964 A1* | 8/2010 | Pack | G06T 7/521 |
| | | | 703/1 |
| 2010/0204974 A1 | 8/2010 | Israelsen et al. | |
| 2012/0033196 A1* | 2/2012 | Vanek | G01S 7/4808 |
| | | | 356/4.01 |
| 2012/0038902 A1 | 2/2012 | Dotson | |
| 2012/0038903 A1* | 2/2012 | Weimer | G01C 3/08 |
| | | | 356/4.07 |
| 2012/0155744 A1 | 6/2012 | Kennedy et al. | |
| 2012/0243774 A1* | 9/2012 | Chen | G06T 15/205 |
| | | | 382/154 |
| 2013/0013185 A1* | 1/2013 | Smitherman | G01C 11/025 |
| | | | 701/409 |
| 2013/0060540 A1* | 3/2013 | Frahm | G06T 15/06 |
| | | | 703/2 |

OTHER PUBLICATIONS

Toth et al., "Terrain-Based Navigation: Trajectory Recovery from LiDAR Data," Record-IEEE Plans, Position Location and Navigation Symposium, pp. 760-765 (2008).
Brenner, "Building reconstruction from images and laser scanning," International Journal of Applied Earth Observation and Geoinformation, vol. 6, pp. 187-198 (2005).
Extended European Search Report in European Application No. 13871359.9, dated Aug. 22, 2016.

* cited by examiner

METHOD AND ARRANGEMENT FOR DEVELOPING A THREE DIMENSIONAL MODEL OF AN ENVIRONMENT

TECHNICAL FIELD

The present invention relates to a method and arrangement for developing a 3D model of an environment.

TECHNICAL BACKGROUND

A fast growing market both in civilian and military business is geographical information systems. Knowledge about geographical conditions forms a fundamental decision support to companies, authorities and in the military. The geographical information can comprise digital maps having superposed information layers such as infrastructure, terrain type and different types of objects. This way of providing digital maps is time consuming and comprises forming two dimensional maps comprising capturing images of the terrain from an aircraft and post-processing of the captured images. It is an even more time consuming process to form three dimensional maps from captured images or range data sets of the terrain/infrastructure.

WO 2009/003529 relates to another type of geographical information system. It relates to an arrangement and a method for providing a three dimensional map representation or a model of an area. The arrangement comprises a processing unit arranged to, for a plurality of time recorded, overlapping images of the area to be stereo processed, associate navigation states so that each pixel of each time recorded image is correlated to a corresponding navigation state and to perform the stereo processing based on the associated navigation states so that all pixels in the map representation or 3D model are specified in three geographical dimensions.

One problem with the stereo processing of overlapping images is that a sharp spatial change tends to disappear or partly disappear during the stereo processing since only a part of the overlapping images catches the sharp spatial change. One way to overcome this problem is to introduce a laser rangefinder or a LIDAR device in the vicinity of the imaging device. Laser range measurements are conducted on a particular object or area during the period when the overlapping images are taken of the particular object or area. Each laser range measurement is very accurate at a single point and can be used to improve the accuracy of the 3D model.

US2010/0204974 discloses a LIDAR and one or more electro-optical (EO) imaging device which may asynchronously acquire LIDAR shots and EO images. Navigation and timing data may be used to associate a particular LIDAR shot and/or EO image with navigation data. The navigation data may be used to cross correlate a LIDAR shot to a selected plurality of overlapping EO images. Ranging model information may be determined from EO image sequences using a stereo imaging technique. The stereo imaging technique may be seeded using the LIDAR shot data.

One object of the present invention is to further improve modelling.

SUMMARY OF INVENTION

This has in one example been solved by means of a method for developing a 3D model of an environment. The method comprises the steps of providing a plurality of overlapping images of the environment, each image being associated to navigation data; providing distance information, said distance information comprising a distance value and navigation data from a plurality of distance measurements; and developing the 3D model based on the plurality of overlapping images and the distance information. The step of developing the 3D model comprises the steps of providing the 3D model based on the plurality of overlapping images and updating the 3D model with the distance information using an iterative process.

In one option, the step of providing of a plurality of overlapping images of the environment comprises capturing a plurality of overlapping images of the environment using an imaging device, providing navigation data related to the images; and associating the plurality of overlapping images with respective navigation data.

In one option, the step of providing the distance information comprises transmitting a plurality of pulses from a distance measuring device for reflection in the environment, receiving pulses reflected from the environment; providing navigation data related to the transmitted and/or received pulses; determining information related to a relation between time of transmission and time of reception of each received pulse; and associating positioning data to each information related the relation between time of transmission and time of reception with respective navigation data;

The distance information may be provided by means of LIDAR, wherein the pulses are laser pulses. The distance information may be provided by means of radar. The distance information may be provided by means of sonar.

The navigation data comprises information regarding position, orientation and timing.

In one option, the method further comprises a step of determining a weight relation between the distance measurement and the provided 3D model, wherein the updating of the 3D model with the distance information is based on the determined weight. The weight relation may be determined based on a percentage of a difference between the value from the distance measurement and the provided model. The weight relation may be determined based on an uncertainty in the provided 3D model. The weight relation may be determined based on an uncertainty in the distance measurement.

In one option, the step of developing the 3D model comprises the steps of:
a) determining stereo distances from the overlapping images;
b) generating the 3D model based on the stereo distances from a selection of the overlapping images;
c) determining the difference between the 3D model and the distance information;
d) updating the 3D model based on the difference between the 3D model and the distance information and based on the determined weight relation,
e) evaluate the updated model against the provided model to determine which of the models is most accurate
f) updating the selection of the overlapping images based on the evaluation,
g) repeating step b) to f).

Step e) of evaluating the updated model against the provided model may comprise re-projecting the stereo images based on the updated 3D model.

Step f) of updating the selection of overlapping images may comprise selecting only those images and/or sub-images which show parts of the environment relevant for the most accurate model.

Step g) of repeating the step of developing the 3D model may comprise the steps of determining a difference between the model generated based on stereo distances and a model generated based on stereo distances in a previous step, wherein the development of the 3D model is exited if the if the difference is below a selected level.

The 3D model may be represented as a mesh. The 3D model may be represented as a surface representation. The 3D model may be represented as a voxel representation The invention also relates to a computer program comprising a program code for developing a 3D model of an environment, comprising the step of providing a plurality of overlapping images of the environment, each image associated of navigation data, providing distance information, said LIDAR information comprising a distance value and navigation data from a plurality of distance measurements; and developing the 3D model based on the plurality of overlapping images and the distance information. The step of developing the 3D model comprises the steps of providing the 3D model based on the plurality of overlapping images; and updating the 3D model with the distance information using an iterative process.

The invention also relates to a computer program product comprising a program code stored on a computer readable media for developing a 3D model of an environment, comprising the step of providing a plurality of overlapping images of the environment, each image associated of navigation data, providing distance information, said LIDAR information comprising a distance value and navigation data from a plurality of distance measurements; and developing the 3D model based on the plurality of overlapping images and the distance information. The step of developing the 3D model comprises the steps of providing the 3D model based on the plurality of overlapping images; and updating the 3D model with the distance information using an iterative process.

In one embodiment, the present invention comprises an arrangement for developing a 3D model of an environment, said arrangement comprising a memory arranged to store a plurality of overlapping images of the environment, each image associated to navigation data and to store distance information comprising a distance value and navigation data from a plurality of distance measurements; a processing unit arranged to develop the 3D model based on the plurality of overlapping images and the distance information. The processing unit is arranged to determine the 3D model based on the plurality of overlapping images; and to update the 3D model with the distance information using an iterative process.

BRIEF DESCRIPTION OF FIGURES

The invention will be further described with reference to the accompanying drawings.

DETAILED DESCRIPTIONS OF INVENTION

Figure 1:
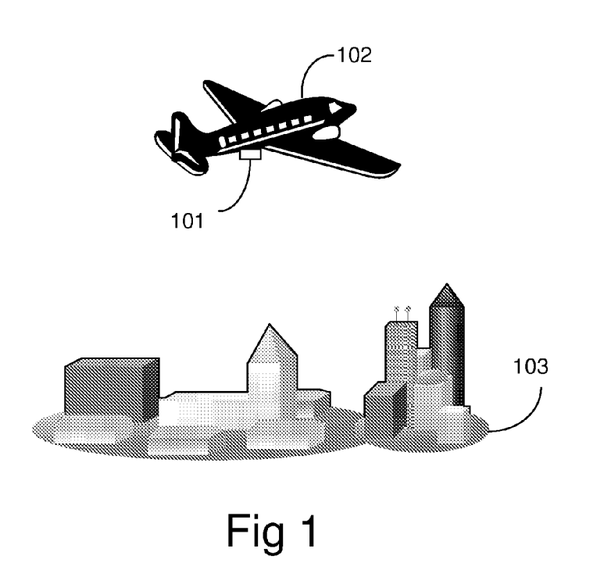
FIG. 1 illustrates an arrangement for developing a 3D model of an environment at least partly mounted on an aircraft.

In FIG. 1, an arrangement 101 for developing a three dimensional model of an environment 103 is mounted on a movable carrier 102. In the illustrated example, the carrier is a in an airborne vehicle. The airborne vehicle is for example a manned or unmanned fighter or civilian aircraft. The movable carrier is in an alternative example (not shown) a satellite, a land vehicle, or a watercraft, for example a lorry, ship or submarine. The arrangement 101 can also be hand held or mounted on a person. In one example, only parts of the arrangement are mounted in the movable carrier while other parts, for example processing parts, are at a remote location.

The three dimensional model provided by the arrangement 101 is related to geographical coordinate system. The 3D model is provided from stereo image processing a plurality of overlapping geo-referenced images of the environment. The geo-referenced images are provided from at least one camera. In addition thereto, the 3D model is updated with information from a distance measuring device.

In one example, one or a plurality of cameras can be used comprising a camera for visual light, an IR camera, and/or a video camera. The distance measuring device can be any type of distance measuring device arranged to determine a distance with spatial resolution. The distance measuring device comprises a transmitter arranged to continuously transmit pulses a receiver arranged to receive pulses transmitted from the transmitter and reflected in the environment. The distance measuring device is arranged to determine a distance to the reflection point based on the time difference between transmittal and reception at a certain pulse. The distance measuring device is in one example operating based on optical light, ultrasonic and/or radar based. The optical distance measuring device is in one example LIDAR based. In one example, the optical distance measuring device comprises a laser transmitter and a detector arranged to detect laser radiation. In one example, the transmitter is a projector transmitting a light pattern and the associated receiver is a camera. In the following description, the distance measurements will be described in relation to LIDAR.

Thus, the arrangement for developing the three dimensional model comprises at least one camera and a LIDAR device supported by a movable carrier 102. The LIDAR device is configured to obtain ranging information of the environment by transmitting laser energy towards the environment and detecting laser energy reflected and/or emitted there from.

The arrangement 101 for developing the three dimensional model is then arranged to first provide the 3D model based on the plurality of overlapping images and then to update the 3D model with the LIDAR information. A difference between the provided 3D model and the LIDAR information is in one example determined at each location where LIDAR information is available. The weight of the LIDAR measurement in the updated model is determined based on a predetermined scheme. For example, the weight of the LIDAR information is determined as a percentage of the of a difference between the 3D model and the LIDAR information. In one example, the percentage is 100% of the difference, i.e. the weight of the LIDAR information is 100%. In an alternative example, the weight of the LIDAR information is 40-60%. In one example, an uncertainty in the 3D model is determined at each location where LIDAR information is available. In this example, the weight of the LIDAR information is also or instead determined based on the uncertainty in the 3D model. Detailed examples of uncertainties in the 3D model will be described in relation to FIG. 5. Further, an uncertainty can also be determined related to the LIDAR measurement. The weight of the LIDAR measurement in the updated model is then also or instead determined based on the uncertainty in the LIDAR measurement.

Figure 2:
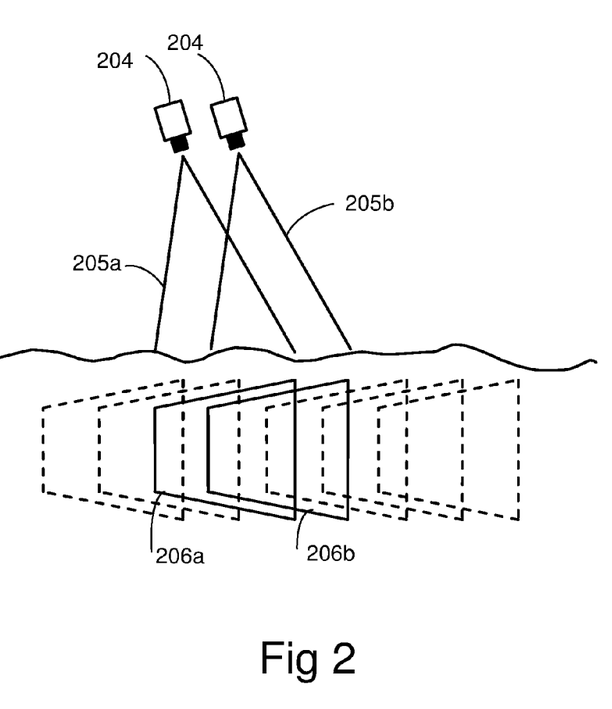
FIG. 2 illustrates schematically the function of a camera in the arrangement in FIG. 1.

In FIG. 2, at least one camera 204 is illustrated supported by a not shown movable carrier. At a first time, the at least one camera is pointing in a first direction to a first field of view 205a for a first image 206a captured by the camera 204. At a second time, the at least one camera 204 is directed in a second direction to a second field of view 205b for a second image 206b captured by the camera 204. The at least one camera 204 is arranged to provide a plurality of at least partly overlapping images 206a, 206b each covering at least a part of the environment. The model can be made better the more images from different camera positions are available in modelling an object or a surface in the environment. In one example, when images are captured from an airborne vehicle, some surfaces visible from many positions in the air are captured in 20 or more different images while other surfaces are visible in fewer different images.

Figure 3:
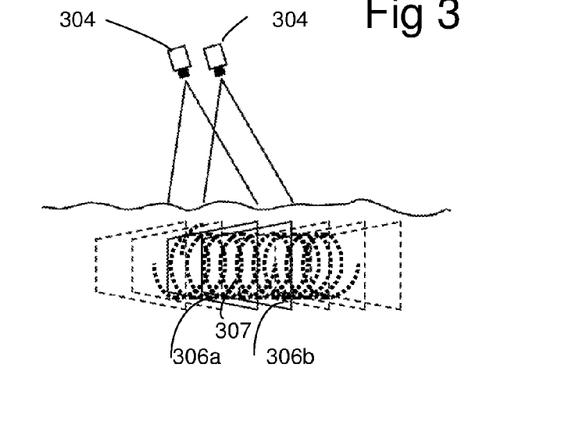
FIG. 3 illustrates schematically the function of a camera and a LIDAR device in the arrangement in FIG. 1.

In FIG. 3, a distance measuring device (not shown) is arranged on a moving carrier together with above described camera(s) 304. We herein describe the distance measurement device in relation to LIDAR. The ranging information provided from the LIDAR measurements is used to assist developing a 3D model. The LIDAR device is directed to the ground to scan with pulses 307 the same parts as covered by images 306a, 306b taken by the camera(s) 304. The area of a LIDAR pulse is much smaller than the area of an image taken from the same height. Therefore in one example, a plurality of LIDAR pulses are provided within the area of each image.

Figure 4A:
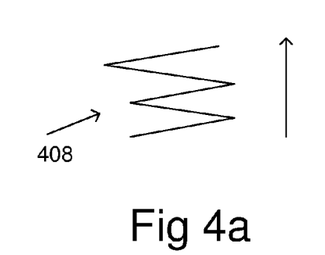
FIGS. 4a and 4b illustrate schematically an example of a scanning pattern provided by the LIDAR device in the arrangement in FIG. 1.
Figure 4B:
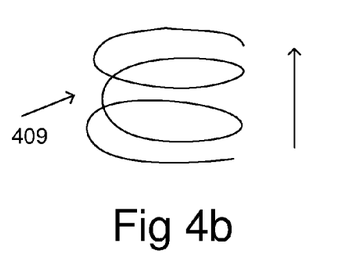

In FIGS. 4a and 4b, examples of different scanning patterns 408, 409 on the ground provided by a distance measuring device arranged on a moving carrier are illustrated. The direction of the movable carrier (not shown) is illustrated with an arrow. In 4a, the laser is arranged to perform a movement back and forward in a direction substantially perpendicular to the direction of movement of the movable carrier (not shown) to scan the environment in a zigzag pattern 408. In FIG. 4b, the LIDAR device is arranged so that the laser beam directed to the environment rotates in a circle, thereby providing LIDAR pulses 231 forming a helical pattern 409 as the carrier moves in the direction of the arrow so as to scan the environment. In one example, the LIDAR device is arranged to perform the linear and/or circular movement. In an alternative example, the LIDAR device is fixedly arranged and a mirror arrangement in the beam path from the LIDAR device is arranged to perform a pivoting movement so as to provide the linear and/or circular scanning. An advantage with LIDAR pulses forming a helical pattern is that high resolution in all direction are achieved since the difference between two LIDAR pulses in a certain direction is small at least between some pairs of LIDAR pulses along the plurality of LIDAR pulses forming a helical pattern. It should be mentioned that the plurality of LIDAR pulses can form any other pattern, such as sine formed pattern or any irregular pattern.

In one example, the camera images are taken and the distance measures are performed at different times. In an alternative example, the camera images are taken and the distance measures are performed at the same time.

Figure 5:
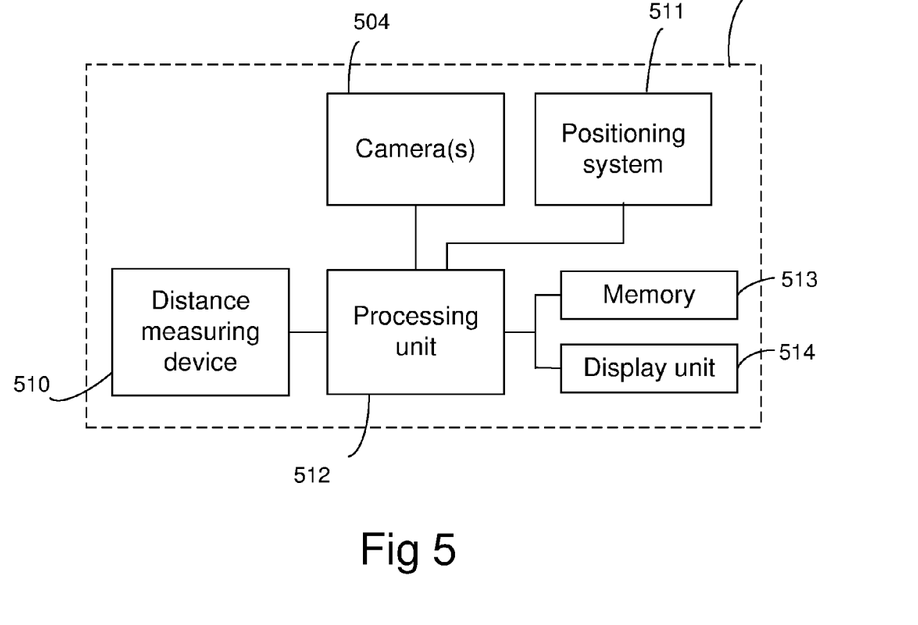
FIG. 5 is a block scheme illustrating an example of the arrangement of FIG. 1.

In the example of FIG. 5, a 3D model is provided using an arrangement 501 for developing a three dimensional model of an environment. The arrangement 501 comprises at least one camera 504 arranged to generate images. The at least one camera 504 is arranged to provide a plurality overlapping images covering the environment for which the model is built. The camera is for example a camera for visual light or an IR camera.

The arrangement 501 comprises further a distance measuring device 510. As described in relation to FIG. 1, the distance measuring device 510 can be any type of distance measuring device arranged to determine a distance with spatial resolution. For example, ladar, sonar, distance measurement using structured light and/or radar can be used in addition to measurements based on camera images. As stated above, in the following description, the distance measurements will be described in relation to LIDAR.

The arrangement 501 comprises in accordance with this example further a positioning system 511 or a receiver of a positioning system arranged to provide positioning and direction information related to the at least one camera and related to the LIDAR device. The direction information relates to the optical direction of the camera/LIDAR device. The images are associated to this positioning and direction information. Further, the distance measurements are associated to this positioning and direction information. Further, the images and/or LIDAR measured distances may be associated to timing information. The timing information is provided with accuracy sufficient for the application.

The positioning system 511 comprises in one example a receiver of a satellite based positioning system, such as GPS. The positioning system may also comprise an inertial navigation system. The timing information may be provided from the receiver in the positioning system, said receiver being arranged to receive and process signals of a satellite based positioning system, such as GPS.

Further, the arrangement 501 comprises a processing unit 512 arranged to, based on the position and direction information related to the at least one camera 504, stereo image process an arbitrary number of at least partly overlapping image sets generated by the at least one camera so as to provide the three dimensional model. In detail, the processing unit 512 is in one example arranged to find corresponding points in the at least partly overlapping images and to find disparity estimations based on the corresponding points so as to provide the stereo image processing. In one example, the processing unit 512 is arranged to, for each image to be stereo image processed, associate the position and direction information so that each pixel of each image is correlated to corresponding position and direction information. The stereo image processing is then performed based on the associated position and direction information so that all pixels in the 3D model are specified in three geographical dimensions.

In one example, the processing unit 512 is arranged to divide the environment into a plurality of areas or points, providing for each area or point a plurality of geo-referenced image sets, wherein each image comprises the area or point, performing for each area or point image stereo processing on each image set so as to provide a plurality of 3D sub models for that area or point and providing the 3D model for each area or point based on the plurality of 3D sub-models. For example, the 3D model for each area or point is provided by averaging the point or area provided from the different sub-models. In one example, the images or image sets are associated to a weigh factor dependent on the quality of the image. The averaging can then be weighted. Finally, the processing unit 512 is arranged to compose the 3D model based on the 3D models related to the different areas or points.

The processing unit 512 may be arranged to perform bundle adjustment.

The processing unit 512 is further arranged to provide the 3D model also based on information from the distance measurement device 510. The processing unit 512 is in one example arranged to develop the 3D model based on the plurality of overlapping images and to update the model with the distance information from the distance measuring device, where appropriate. In detail, the 3D model covering a given area or environment is developed using the plurality of overlapping images. The 3D model is then compared with information from the distance measuring device. In those parts of the environment where the 3D model substantially coincides with the information provided from the distance measurements, the provided 3D model is regarded as finalized. However, in those parts of the 3D model where there is a discrepancy between the 3D model and the information from the distance measurements, the 3D model is updated in those parts, based on the distance information. The weight of the distance information in the updated model may be determined as described above and will be exemplified more in detail below.

The processing unit 512 is arranged to verify that the 3D model parts updated based on the distance information better describes the reality as presented in the images than the corresponding 3D model not updated with the distance information. This is in one example performed by re-projecting one image to another image in those parts where the model has been updated so as to determine if the updated model gives a better re-projected estimated image than the not updated model. In detail, the not updated model and the updated model can be determined based on comparing an image $I_2$ taken from one certain location with different estimated images $\hat{I}_2$ determined for the same certain location. The estimated images are determined based on another image $I_1$ taken from another location and projected in the not updated 3D model respectively the updated 3D model to the position of the location of the image $I_2$. Thus the estimated image is determined as $\hat{I}_2 = f(I_1\ M)$, wherein M represents the not updated 3D model respectively the updated model. In comparing the image $I_2$ taken from the certain location with the estimated images $\hat{I}_2$ that estimated image $\hat{I}_2$ which is most similar to the original image $I_2$ is associated to the best model. In one example, the images are compared or matched in small windows of the images. Thus, the images are compared on a sub-image by sub-image basis. In one example, the matching is performed based on a correlation technique. In one example, the matching is performed based on a phase based algorithm. In one example, the matching is performed based on a segmentation based algorithm.

Thus, if the model performed based only on the overlapping images provides the best image estimate for the image $I_2$, then it is assumed that the distance information should not be used in the model or at least to a smaller extent than in the updated model. If on the other hand, the model developed based also on the distance information gives the best image estimate for the image $I_2$, then it is assumed that the distance information enhances the 3D model.

The processing unit 512 may be arranged to verify in other ways known to the person skilled in the art that the 3D model updated based on the distance information better describes the reality as presented in the images than the 3D model not updated with the distance information.

In those parts of the 3D model where it has been determined that the distance information enhances the 3D model, the processing unit 512 is arranged to repeat the development of a model based on only overlapping images. This time, the developing of the model is based on a selection of the overlapping images in which the coordinates of the updated model are visible. The processing unit 512 is then arranged to compare the model with the distance information. If there is a difference between the model and the distance information at some point, then the 3D model is updated in this point as described above. The processing unit is then arranged to verify that the 3D model updated based on the distance information better describes the reality as presented in the images than the 3D model not updated with the distance information, as described above. If it is verified that the updated model better describes the environment, the processing unit 512 is arranged to repeat the development of the model based on a selection of the overlapping images and/or based on a selection of overlapping sub-images. If it is not verified that the updated model better describes the environment, the updating of the model may be finalized or repeated again using a decreased influence from the distance measurement. If for example, the distance information is wrong, such as if it has been measured against a flying bird, this distance information will not improve the model and will thus be rejected in the verification of the updated model.

The processing unit 512 is in one example arranged to determine a difference between the developed model and a model developed in the previous step and to exit the development of the 3D model if the difference decreases a predetermined value. As is understood from above, the processing unit 512 may also be arranged to exit the development of the model if the distance information is determined not to improve the model.

The processing unit 512 is in one example arranged to determine an uncertainty at some locations or at each location where LIDAR information is available. The processing unit is then arranged to determine the weight of the LIDAR measurement in the updated model based on the uncertainty in the 3D model at that specific location. In one example, the uncertainty in the model is determined based on the angle between the optical axis of the camera images used for modelling and a plane of the surface of the model at that specific location. For example, for surfaces of the 3D model which are perpendicular to an optical axis of the camera at that specific location, the uncertainty in the 3D model is lower than for surfaces which are substantially parallel to the optical axis of the camera. Further, points measured by the LIDAR device, which are not visible for any of the cameras since there are modelled objects which obscure this location, the uncertainty of the model may be regarded as high. The processing unit 512 may further be arranged to determine an uncertainty related to the LIDAR measurement. The weight of the LIDAR measurement in the updated model is then determined based on the uncertainty in the 3D model and/or the uncertainty in the LIDAR measurement.

In one example, the 3D model is represented as a mesh. In an alternative example, the 3D model is represented as a surface representation. In an alternative example, the 3D model is represented as a voxel representation.

The processing unit 512 comprises in one example a computer program comprising a program code for developing a 3D model as discussed above. Further, a computer program product comprises a program code stored on a computer readable media for developing a 3D model of an environment.

In the shown example, the arrangement 501 also comprises a memory 513 for storing data related to the three dimensional model calculated by the processing unit 512. The memory is also arranged to store information related to the overlapping images and the distance information. The arrangement 501 further comprises a display or presentation unit 514 arranged to provide information related to the 3D model. The display unit may be arranged to present a selected part of the 3D model. The arrangement 501 may also comprise input means (not shown) for selecting a part of the 3D model and the display is arranged to present information related to the selected part.

The arrangement 501 may also comprise a transmitter (not shown) arranged to transmit the information related to the 3D model to a receiver in a remote location. In one example, the transmitter at least partly substitutes the memory 513 and/or the display unit 514. In an alternative example, the transmitter is provided in addition to the memory 513 and/or the display unit 514. In one example, the arrangement does not comprise the camera(s) 504 and the distance measuring device 510. The processing unit 512 is then arranged to develop the model based on image and distance information stored in the memory 513.

Figure 6:
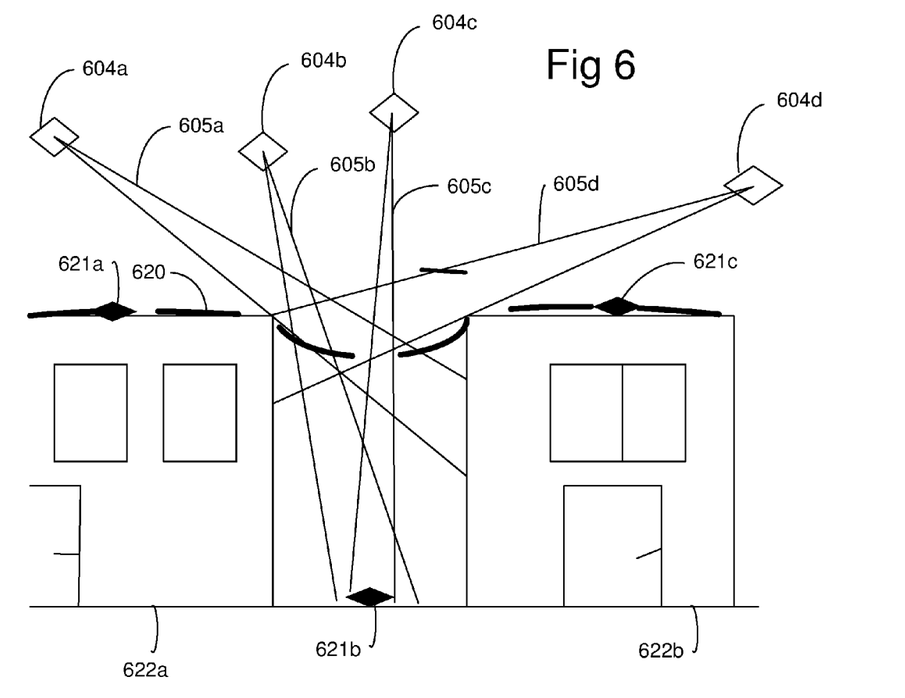
FIG. 6 is a schematic illustration of a first part of modelling a scene between buildings.

In FIG. 6, a first part of a procedure for developing a 3D model of an environment is illustrated. A 3D model 620 has been determined based on images taken from a plurality of camera locations 604a, 604b, 604c, 604d. In the illustrated example, a field of view 605a, 605b, 605c, 605d is shown for the respective camera 604a, 604b, 604c, 604d at the time of taking the images. Thus the field of view illustrates the cover of the images captured.

The 3D model 620 is compared to LIDAR measurement points 621a, 621b, 621c at corresponding locations. In the illustrated example, the 3D model and the LIDAR measurements are substantially coinciding at a first and third measurement location 621a, 621c. However, the LIDAR measurement point 621b differs from a corresponding point in the model 620. In the illustrated example, the second measurement point 621b of the LIDAR measurement is formed at the ground of an alley between two buildings 622a, 622b. As the 3D model and the LIDAR measurement differs, the 3D model is locally drawn in a direction towards the LIDAR measurement point. In one example, the 3D model 620 is drawn to at least one updated point between the model and the second measurement point 621b as determined by a weight of the LIDAR measurement. In one example, the at least one updated point is selected such that the 3D model 620 is drawn to the second measurement point 621b. In one example, the at least one updated point is determined based on the weight of the LIDAR information. The weight of the LIDAR information is determined based on a predetermined scheme, as earlier discussed.

In one example the weight of the LIDAR measurement is also or instead determined based on an uncertainty in the 3D model. In one example, the uncertainty in the model is based on the angular relationship between the surface of the model 620 at the location of the second measurement point 621b and the optical axes of the cameras when taking the available images. If the surface and the optical axes are close to parallel, then uncertainty is greater than if the relation between the surface and the optical axes is close to perpendicular.

Further, in one example, the uncertainty in the model is instead or in addition thereto determined by from how many or for how high percentage of the camera images the LIDAR measurement points are visible. In this illustrated example, only a few of the camera images are taken from such location and in such direction that the LIDAR measurement point would be visible. The uncertainty is in one example then higher than if the LIDAR point is visible from a high percentage or substantially all the images used in the development of the 3D model. The 3D model point is determined to be moved towards the corresponding LIDAR measurement location to an extent determined based on the 3D model uncertainty.

Figure 7:
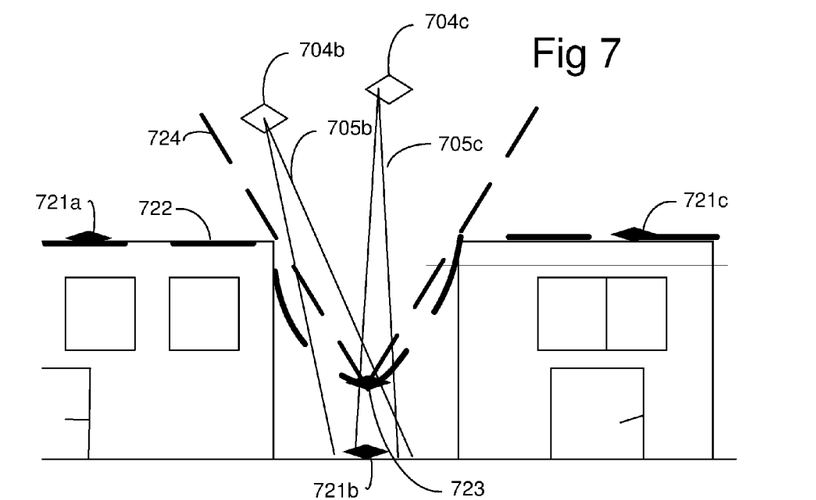
FIG. 7 is a schematic illustration of a second part of modelling a scene between buildings.

In FIG. 7, a second part of a procedure for developing a 3D model of an environment is shown. An updated model 722 has been determined. The updated model is based on the model developed only using overlapping image pairs and updated with at least one updated point 723 determined based on the distance information. As discussed above, the weight of the distance information has been determined according to a predetermined scheme The updated model 722 is evaluated. This was also described in relation to FIG. 5. If the updated model 722 is considered to be better than the not updated model, then the model will be re-developed using only those images which shows the updated point(s) 723 of the 3D model provided based on the second measurement point (621b in FIG. 6) and based on the weight of the LIDAR measurement. In FIG. 7, a cone 724 illustrates which images and/or sub-images may be used for the re-developed of the model. The procedure as described in relation to FIG. 6 is repeated using the images in the determined cone. Thus, a 3D model 620 will be determined based on the images taken from a plurality of camera locations 704b, 704c within the cone 724. Sub-images may also be used, In the illustrated example, a field of view 705b, 705c is shown for the respective camera 704b, 704c at the time of taking the images. Thus the field of view illustrates the cover of the images captured.

Figure 8:
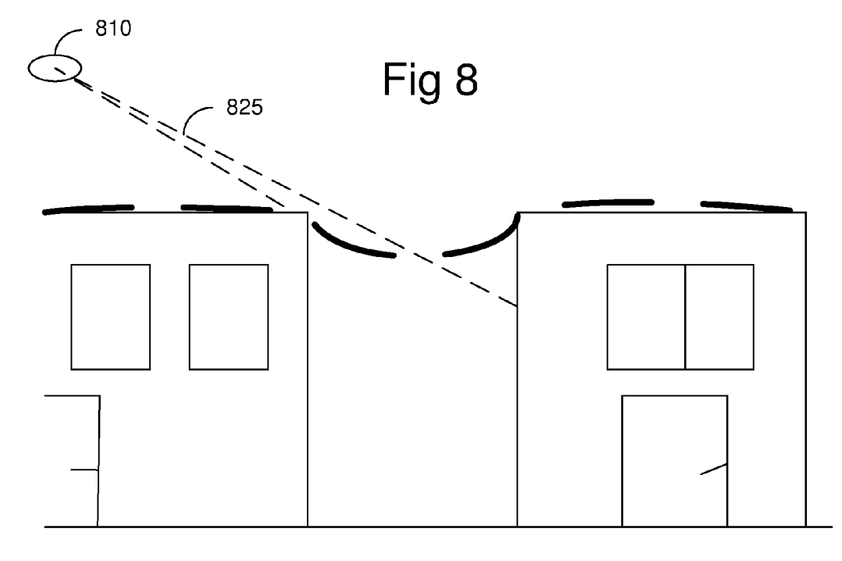
FIG. 8 is a schematic illustration of a scene wherein a laser pulse is transmitted.

In FIG. 8, it is illustrated an example wherein it would be useful that weight of the LIDAR measurement is determined based on an uncertainty in the LIDAR measurement. The pulse from a LIDAR device 810 used has a beam lobe 825 having a certain size in cross section. In the illustrated example, one pulse for determining a distance generates two different distance results due to the extent of the lobe 825 in its cross section. Thus, there is an uncertainty in the distance measurements at sharp edges or boarders such as buildings. In this case, the weight of the LIDAR information may be less than in areas where a high spatial resolution is not required in a plane perpendicular to the beam.

Figure 9:
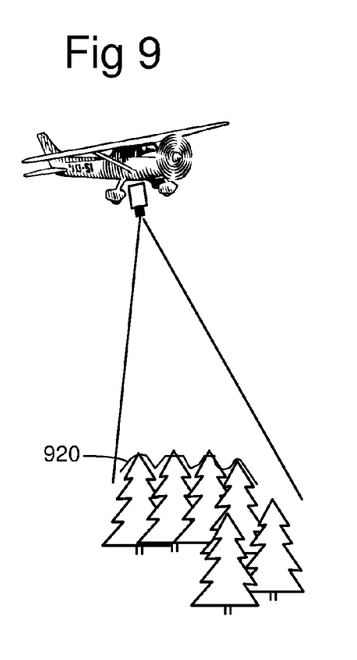
FIG. 9 is a schematic illustration of modelling a scene with a forest.

In FIG. 9, a model of a forest is developed. In this situation, the model produced by the images and the LIDAR measurements will provide different results. A model 920 provided based on overlapping images will be close to the tree tops and potentially the tree tops will not be modelled to their full extent. The LIDAR measurements will provide spread measurement points. Some measurement points will be in the tree tops and some measurement points will be close to ground. Thus situation can be handled in a plurality of ways. In one example, the LIDAR measurements are evaluated and it can be determined from the pattern of points that these points cannot be used in the modelling. Then those LIDAR measurement points which are not desirable to use can be removed. In one additional or alternative example, the LIDAR measurement points are used. Those which are close to the ground will be determined not to improve the model and will thus be rejected. Those LIDAR measurement points which are close to the tree tops can be used to model the tree tops more close to their full extension. In a third example, the pattern of the LIDAR measurement points are used for determining an uncertainty in the LIDAR information and thus can be used in modelling to an extent determined by the uncertainty in the LIDAR measurement. These different examples may be combined.

Figure 10:
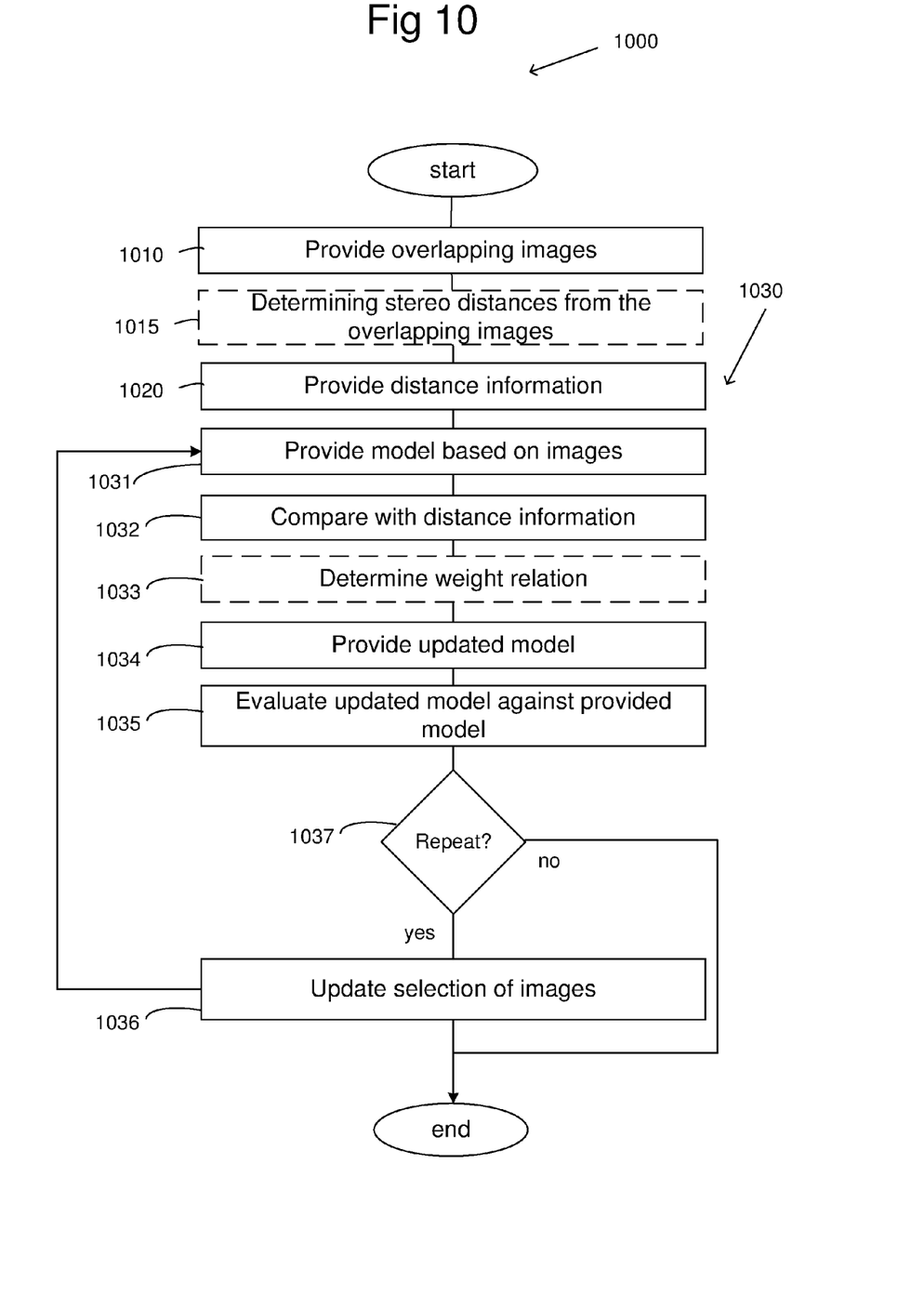
FIG. 10 shows a flow chart illustrating an example of a method for developing a 3D model of an environment.

In FIG. 10 an example of a method 1000 for developing a 3D model based on overlapping images and distance information is illustrated. The method comprises providing 1010, overlapping images associated to navigation data. Further, distance information is also provided 1020 comprising a distance value and associated to navigation data. Thereafter, the 3D model is developed 1030 based on the plurality of overlapping images and the distance information. In developing the 3D model, the 3D model is provided 1031 based on the plurality of overlapping images, the provided 1031 model is compared 1032 with the distance information and the provided model is updated 1034 with the distance information using an iterative process, where appropriate. In one example, a weight relation between the distance measurement and the provided 3D model is determined 1033. The 3D model can then be updated 1034 with the distance information on the determined 1033 weight. The weight relation may for example be determined based on a percentage of a difference between the value from the distance measurement and the provided model. The weight relation can also or instead be determined based on an uncertainty in the provided 3D model. The weight relation may instead or in addition thereto be determined based on an uncertainty in the distance measurement.

In one example, the stereo distances are determined 1015 from the provided overlapping images. The model can then be provided based on the determined stereo distances. In one example, the stereo distances are determined from the overlapping images based on correlation. In one example, the stereo distances are determining from the overlapping images based on a phase based algorithm. In one example, the stereo distances are determined from the overlapping images is based on segmentation based algorithm. In one example, any other stereo method known to the person skilled in the art is used.

The updated mode is then evaluated 1035 against the provided, not updated model to determine which of the models is most accurate. If the not updated model is determined to be most accurate, the development of the model may be finalized. If it is determined that the updated model is most accurate, or at least it is determined that the distance information does improve the model, the process is repeated. The evaluation 1035 of the updated model against the provided model comprises in one example re-projecting the stereo images based on the updated and the not updated 3D models and comparing the results.

The selection of images is then updated 1036 based on the coordinates to the updated model. In one example, the updating 1036 of the selection of overlapping images comprises selecting only those images and/or sub-images which show parts of the environment relevant for the most accurate model (updated or not updated).

Figure 11:
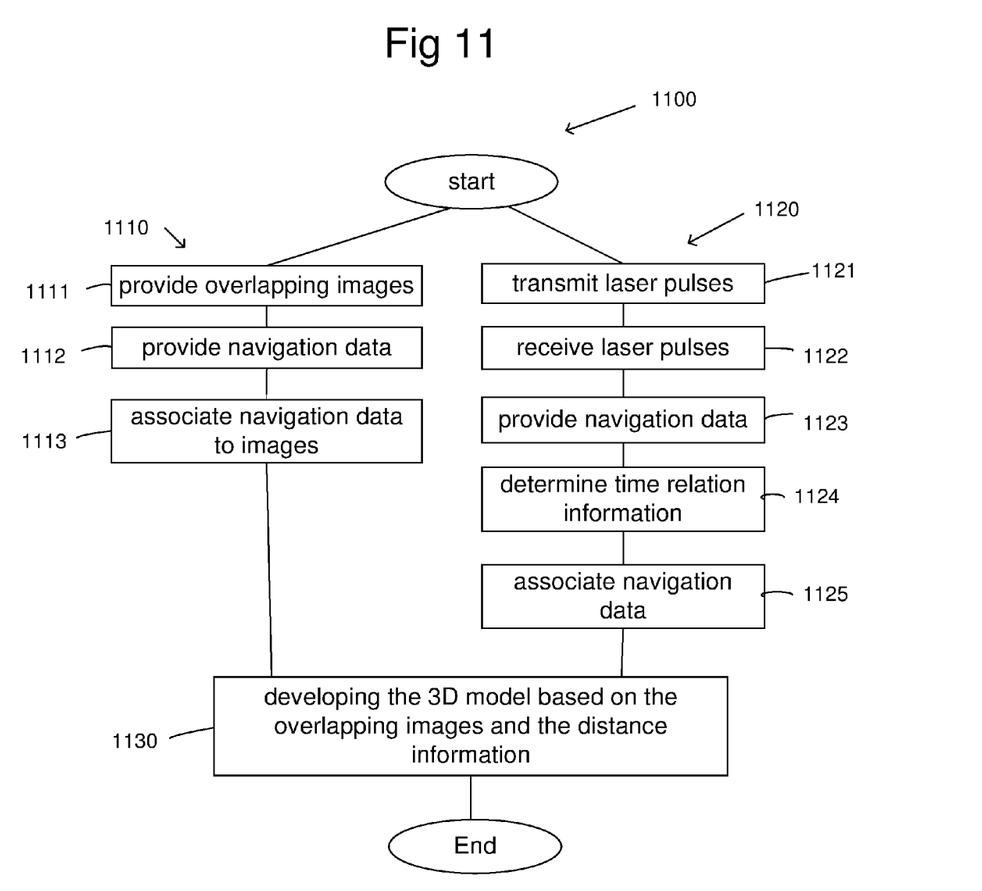
FIG. 11 shows a flow chart illustrating an example of a method for developing a 3D model of an environment.

In one example the decision of repeating 1037 development of the model comprises the steps of determining a difference between the model generated based on the overlapping images and a model generated based on the selection of overlapping in a previous step. The development of the 3D model can then be exited if the difference is below a selected level. In FIG. 11, a flow chart illustrating an example of a method 1100 for developing a 3D model of an environment is shown.

In the illustrated example, a step of providing 1110 image data comprises the steps of providing 1111 a plurality of overlapping images of the environment, providing navigation data 1112 and associating 1113 the navigation data to the respective images. The navigation data may comprise position information and a pointing direction of a camera capturing the images at each instant of capturing. Thus, navigation data may comprise information regarding position and orientation. It may also comprise information related to timing.

Further, as step of providing 1120 distance information comprises the steps of transmitting 1121 a plurality of pulses such as laser from a distance measuring device for reflection in the environment, receiving 1122 pulses reflected from the environment, providing 1123 navigation data related to pulses and determining 1124 information related to a relation between time of transmission and time of reception of each received pulse. The distance between the distance measuring device and the reflection point associated to each pulse can then be determined based on the determined relation. Then navigation data is associated 1125 to each determined distance. The navigation data may comprise position information and the direction of the transmitted pulses. Thus, navigation data may comprise information regarding position and orientation. It may also comprise information related to timing.

In one example, the distance information is provided by means of LIDAR. In one example, the distance information is provided by means of radar. In one example, the distance information is provided by means of sonar.

Thereafter the 3D model is developed 1130 based on the provided image data and based on the provided distance information. In one example, the image data and the distance measurements are provided using the same platform. It may then not be necessary to determine navigation data specifically to both the camera(s) and the distance measuring unit. It may then be enough to know the relation between the camera(s) and the distance measuring device. The 3D model may be represented as a surface representation and/or a voxel and/or a mesh.

The invention claimed is:

1. Method for developing a 3D model of an environment, comprising the steps of:
   providing a plurality of overlapping images of the environment, each image being associated to navigation data;
   providing distance information, said distance information comprising a distance value and navigation data from a plurality of distance measurements;
   developing the 3D model based on the plurality of overlapping images and the distance information; wherein the step of developing the 3D model comprises the steps of providing the 3D model based on the plurality of overlapping images; and
   updating the 3D model with the distance information using an iterative process,
   wherein the development of the 3D model further comprises comparing the 3D model with information from a distance measuring device, updating the 3D model in parts of the 3D model where there is a discrepancy between the 3D model and information from the distance measurements, based on the distance information, and verifying that the 3D model parts updated based on the distance information better describes the reality as presented in the images than the corresponding 3D model not updated with the distance information;

wherein the step of developing the 3D model comprises the steps of: a) determining stereo distances from the overlapping images; b) providing the 3D model based on the stereo distances from a selection of the overlapping images; c) determining a difference between the 3D model and the distance information; d) updating the 3D model based on the difference between the 3D model and the distance information and based on a weight relation, e) evaluating the updated model against a provided model to determine which of the models is most accurate f) updating the selection of the overlapping images based on the evaluation, g) repeating step b) to f).

2. Method according to claim 1, wherein the weight relation is determined between the distance information and the provided 3D model.

3. Method according to claim 2, wherein the weight relation is determined based on a percentage of a difference between the value from the distance measurement and the provided model.

4. Method according to claim 2, wherein the weight relation is determined based on an uncertainty in the provided 3D model.

5. Method according to claim 2, wherein the weight relation is determined based on an uncertainty in the distance measurement.

6. Method according to claim 1, wherein step e) of evaluating the updated model against the provided model comprises re-projecting the stereo images based on the updated 3D model.

7. Method according to claim 1, wherein the step f) of updating the selection of overlapping images comprises selecting only those images and/or sub-images which show parts of the environment relevant for the most accurate model.

8. Method according to claim 1, wherein the step g) of repeating the step of developing the 3D model comprises the steps of: determining a difference between the model generated based on stereo distances and a model generated based on stereo distances in a previous step, wherein the development of the 3D model is exited if the if the difference is below a selected level.

9. Method according to claim 1, wherein the step of providing of a plurality of overlapping images of the environment comprises:
capturing a plurality of overlapping images of the environment using an imaging device;
providing navigation data related to the images; and
associating the plurality of overlapping images with respective navigation data.

10. Method according claim 1, wherein the step of providing the distance information comprises: transmitting a plurality of pulses from a distance measuring device for reflection in the environment; receiving pulses reflected from the environment; providing navigation data related to the transmitted and/or received pulses; determining information related to a relation between time of transmission and time of reception of each received pulse; associating positioning data to each information related to the relation between time of transmission and time of reception with respective navigation data.

11. Method according to claim 1, wherein the distance information is provided by means of LIDAR, wherein the pulses are laser pulses.

12. Method according to claim 1, wherein the distance information is provided by means of radar.

13. Method according to claim 1, wherein the distance information is provided by means of sonar.

14. Method according to claim 1, wherein the navigation data comprises information regarding position, orientation and optionally timing.

15. Method according to claim 1, wherein the 3D model is represented as a mesh.

16. Method according to claim 1, wherein the 3D model is represented as a surface representation.

17. Method according to claim 1, wherein the 3D model is represented as a voxel representation.

18. Computer program product comprising a non-transitory computer readable media with a program code for developing a 3D model of an environment, comprising the step of:
providing a plurality of overlapping images of the environment, each image associated of navigation data;
providing distance information, said LIDAR information comprising a distance value and navigation data from a plurality of distance measurements;
developing the 3D model based on the plurality of overlapping images and the distance information;
wherein the step of developing the 3D model comprises the steps of: providing the 3D model based on the plurality of overlapping images; and updating the 3D model with the distance information using an iterative process, said development of the 3D model comprises comparing the 3D model with information from a distance measuring device, updating the 3D model in parts of the 3D model where there is a discrepancy between the 3D model and information from the distance measurements, based on the distance information, and verifying that the 3D model parts updated based on the distance information better describes the reality as presented in the images than the corresponding 3D model not updated with the distance information;
wherein the step of developing the 3D model comprises the steps of: a) determining stereo distances from the overlapping images; b) providing the 3D model based on the stereo distances from a selection of the overlapping images; c) determining a difference between the 3D model and the distance information; d) updating the 3D model based on the difference between the 3D model and the distance information and based on a weight relation, e) evaluating the updated model against a provided model to determine which of the models is most accurate f) updating the selection of the overlapping images based on the evaluation, g) repeating step b) to f).

19. Arrangement for developing a 3D model of an environment, said arrangement comprising a memory arranged to store a plurality of overlapping images of the environment, each image associated to navigation data and to store distance information comprising a distance value and navigation data from a plurality of distance measurements; a processing unit arranged to develop the 3D model based on the plurality of overlapping images and the distance information; wherein that the processing unit is arranged to determine the 3D model based on the plurality of overlapping images; and to update the 3D model with the distance information using an iterative process, wherein the processing unit is arranged to compare the determined 3D model with information from a distance measuring device, to update the determined 3D model in parts of the determined 3D model where there is a discrepancy between the determined 3D model and information from the distance measurements, based on the distance information, and to verify that the 3D model parts updated based on the distance information better describes the reality as presented in the images than the corresponding determined 3D model not updated with the distance information;

wherein the step of developing the 3D model comprises the steps of: a) determining stereo distances from the overlapping images; b) providing the 3D model based on the stereo distances from a selection of the overlapping images; c) determining a difference between the 3D model and the distance information; d) updating the 3D model based on the difference between the 3D model and the distance information and based on a weight relation, e) evaluating the updated model against a provided model to determine which of the models is most accurate f) updating the selection of the overlapping images based on the evaluation, g) repeating step b) to f).

* * * * *